(12) United States Patent
Levy et al.

(10) Patent No.: US 11,113,251 B2
(45) Date of Patent: Sep. 7, 2021

(54) TRANSACTION MANAGER

(71) Applicant: Vast Data Ltd., Tel Aviv (IL)

(72) Inventors: Asaf Levy, Tel Aviv (IL); Avi Goren, Tel Aviv (IL); Shachar Fienblit, Ein Ayala (IL)

(73) Assignee: Vast Data Ltd., Tel Aviv (IL)

( * ) Notice: Subject to any disclaimer, the term of this patent is extended or adjusted under 35 U.S.C. 154(b) by 175 days.

(21) Appl. No.: 16/122,036

(22) Filed: Sep. 5, 2018

(65) Prior Publication Data
US 2020/0073964 A1 Mar. 5, 2020

(51) Int. Cl.
| | | |
|---|---|---|
| G06F 16/16 | (2019.01) | |
| G06F 16/18 | (2019.01) | |
| G06F 16/21 | (2019.01) | |
| G06F 16/23 | (2019.01) | |
| G06F 16/176 | (2019.01) | |
| G06F 16/182 | (2019.01) | |
| G06F 9/46 | (2006.01) | |

(52) U.S. Cl.
CPC .......... *G06F 16/1865* (2019.01); *G06F 16/16* (2019.01); *G06F 16/219* (2019.01); *G06F 16/23* (2019.01); *G06F 9/466* (2013.01); *G06F 16/1774* (2019.01); *G06F 16/1827* (2019.01); *G06F 16/2358* (2019.01); *G06F 16/2365* (2019.01); *G06F 16/2379* (2019.01)

(58) Field of Classification Search
CPC ...... G06F 16/1865; G06F 16/16; G06F 16/23; G06F 16/219; G06F 16/2365; G06F 16/2379; G06F 16/1774; G06F 16/2358; G06F 16/1827; G06F 9/466
See application file for complete search history.

(56) References Cited

U.S. PATENT DOCUMENTS

| | | | |
|---|---|---|---|
| 6,704,839 B2 | 3/2004 | Butterworth et al. | |
| 7,289,992 B2 | 10/2007 | Walker | |
| 8,352,448 B2 * | 1/2013 | Haye | G06F 11/1441 707/703 |
| 8,868,506 B1 * | 10/2014 | Bhargava | G06F 16/219 707/648 |
| 9,904,722 B1 * | 2/2018 | Shevade | G06F 16/2358 |
| 10,108,658 B1 * | 10/2018 | Cole | G06F 16/2365 |
| 2012/0079246 A1 * | 3/2012 | Breternitz, Jr. | G06F 9/466 712/208 |

(Continued)

*Primary Examiner* — Dennis Truong
(74) *Attorney, Agent, or Firm* — M&B IP Analysts, LLC (57) ABSTRACT

A system and method for transaction management. The system includes a processing circuitry; and a memory, the memory containing instructions that, when executed by the processing circuitry, configure the system to: assign a transaction identifier (ID) to a transaction, wherein the transaction includes at least one modification to at least one object stored in a storage system, each object having a persistent state, wherein the transaction ID indicates a state of the transaction, wherein the state of the transaction initially indicates that the transaction is in progress; modify the at least one object, wherein the modifying further comprises adding at least one conditional entry to each object, wherein each conditional entry includes one of the at least one modification that is conditional on the state of the transaction; and update the transaction ID when a termination event occurs, wherein the updating further includes changing the state of the transaction.

19 Claims, 5 Drawing Sheets

(56) References Cited

U.S. PATENT DOCUMENTS

| | | | |
|---|---|---|---|
| 2013/0339673 A1* | 12/2013 | Belmar | G06F 9/30 |
| | | | 712/220 |
| 2015/0261540 A1* | 9/2015 | Greiner | G06F 9/3857 |
| | | | 712/226 |
| 2016/0070589 A1* | 3/2016 | Vermeulen | G06F 9/466 |
| | | | 711/153 |
| 2016/0350356 A1* | 12/2016 | Vujic | G06F 16/2336 |
| 2017/0083343 A1* | 3/2017 | Burger | G06F 9/3867 |
| 2017/0149890 A1 | 5/2017 | Shamis et al. | |
| 2017/0185643 A1* | 6/2017 | Doshi | G06F 9/466 |

* cited by examiner

FIG. 5

TRANSACTION MANAGER

TECHNICAL FIELD

The present disclosure relates generally to data storage, and more particularly to managing data storage transactions.

BACKGROUND

In storage systems, there is a need to execute a single logical operation which requires updating multiple objects in an atomic manner. For example, the logical operation may be moving a file between directories. Existing solutions typically involve locking and journaling.

As an example, to move file "x" from directory "A" to directory "B," an existing solution would take a lock on each of directory A, directory B, and file x; write a log to a journal indicating that file x is about to be moved from directory A to directory B; updating directory A to remove file x from its metadata; updating directory B to add file x to its metadata; updating a parent pointer for file x from directory A to directory B; write a log to the journal indicating that the transaction has been successfully completed; and release the locks on file x, directory A, and directory B. If a failure occurs during the transaction, the filesystem performing the transaction reads the journal and rolls back any incomplete transactions.

While this locking and journaling approach is used by many applications, it has various disadvantages. First, multiple objects are locked for a relatively long period of time, which hurts concurrency and reduces overall system performance. Second, locking multiple objects can result in deadlocks if handled improperly, so a specific lock order must be applied. The lock orders become more complicated as the number of objects that must be locked increases, thereby reducing system performance as the system scales. Third, use of a journal adds at least two operations to each transaction (i.e., writing a first log indicating the upcoming move and a second log indicating the completion of the move). Fourth, recovery after failure requires reading the journal and recovering failed transactions before the filesystem may proceed. This prolongs recovery time and may make the system unresponsive.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include for transaction management. The system comprises a processing circuitry; and a memory, the memory containing instructions that, when executed by the processing circuitry, configure the system to: assign a transaction identifier (ID) to a transaction, wherein the transaction includes at least one modification to at least one object, each object having a persistent state, wherein the transaction ID indicates a state of the transaction, wherein the state of the transaction initially indicates that the transaction is in progress; modify the at least one object, wherein the modifying further comprises adding at least one conditional entry to each object, wherein each conditional entry includes one of the at least one modification that is conditional on the state of the transaction; and update the transaction ID when a termination event occurs, wherein the updating further includes changing the state of the transaction.

Certain embodiments disclosed herein also include a non-transitory computer readable medium having stored thereon causing a processing circuitry to execute a process, the process comprising: assigning a transaction identifier (ID) to a transaction, wherein the transaction includes at least one modification to at least one object, each object having a persistent state, wherein the transaction ID indicates a state of the transaction, wherein the state of the transaction initially indicates that the transaction is in progress; modifying the at least one object, wherein the modifying further comprises adding at least one conditional entry to each object, wherein each conditional entry includes one of the at least one modification that is conditional on the state of the transaction; and updating the transaction ID when a termination event occurs, wherein the updating further comprises changing the state of the transaction Certain embodiments disclosed herein also include a method for transaction management. The method comprises: assigning a transaction identifier (ID) to a transaction, wherein the transaction includes at least one modification to at least one object, each object having a persistent state, wherein the transaction ID indicates a state of the transaction, wherein the state of the transaction initially indicates that the transaction is in progress; modifying the at least one object, wherein the modifying further comprises adding at least one conditional entry to each object, wherein each conditional entry includes one of the at least one modification that is conditional on the state of the transaction; and updating the transaction ID when a termination event occurs, wherein the updating further comprises changing the state of the transaction.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a transaction manager and method for managing transactions. The transactions include operations to be performed on objects stored in a storage system. A transaction is assigned a unique transaction identifier (ID). The transaction ID is updated when the operation is completed or cancelled. Any objects that will be affected by the transaction are updated to add conditional entries indicating modifications to the objects that are dependent on the transaction ID. Subsequent reads include identifying these conditional entries and checking states indicated by relevant transaction IDs. The results of such reads depend on whether the condition of each conditional entry is met.

The disclosed embodiments are applicable to transactions including data storage operations to be applied to persistent state data objects stored in a persistent state memory of a storage system. Each object has a persistent state and may be, but is not limited to, a file system, a database, and the like. The objects may be, but are not necessarily, stored in a storage system. As a non-limiting example, a transaction may be a rename operation for changing the name of a file object. As another non-limiting example, a transaction may be a database update spanning multiple tables and rows.

The transaction ID indicates a state of the transaction. Such a state may be, but is not limited to, committed (i.e., the transaction was successfully completed), cancelled (i.e., the transaction failed or an application running the transaction has crashed), or in progress. The state of the transaction may be initially marked in the transaction ID as "in progress" and subsequently updated to "committed" or "cancelled" when the operation has been completed or terminated, respectively.

As a non-limiting example for reading when an object that is a directory includes a conditional entry, such an entry may be "remove file x from directory A if transaction ID TrID is committed." When directory A is read by a reader, the reader identifies the conditional entry and checks TrID. If TrID is marked as committed, the read result does not include file x; otherwise, the read result does include file x.

The disclosed embodiments may be implemented by a transaction manager. In an embodiment, the transaction manager is configured to access a non-volatile memory such as 3D Xpoint of a storage system. To this end, the transaction manager may be included in or otherwise configured to communicate with the storage system. The non-volatile memory includes a bitmap array that is divided into blocks, with each block containing a number N of transaction states. In an example implementation, each block is 4 kilobytes (KB) and contains around 2000 transactions with 2 bits per transaction. A subset of the blocks act as central blocks including transaction ID data indicating which blocks are in use (i.e., which of the blocks include one or more transactions that are in progress). Allocating a transaction ID requires one write for every N transactions. Committing or cancelling a transaction requires marking the relevant bit in the block of transaction states and writing to the non-volatile memory.

The bitmap array size may be final. If so, transaction IDs must be removed to allow for new transaction IDs. The transaction IDs may be removed via a scrubber configured to clean cancelled or completed transactions of system objects. Alternatively, the transaction IDs may be removed during data migration. For example, when the transaction IDs are stored in a 3D Xpoint memory and are migrated to a Flash memory, transaction IDs marked as cancelled may not be migrated such that they are not maintained after being deleted from the 3D Xpoint memory. An example migration in a storage system is described further in U.S. patent application Ser. No. 16/002,804, assigned to the common assignee, the contents of which are hereby incorporated by reference.

In an embodiment, application crashes are detected using instance IDs. To this end, when an instance of an application is started, the instance is assigned a unique instance ID. The instance ID may be generated randomly. Each block allocated for use by the application instance is marked with its respective instance ID. If the application instance crashes, any transactions that are not committed (e.g., transactions having transaction IDs indicating they are in progress) having transaction states residing in blocks marked with the instance ID of the application instance are considered to be cancelled and marked by updating the transaction ID status to cancelled.

The disclosed embodiments provide transaction management that does not require journaling or locking objects for the entire duration of a transaction. Further, the disclosed embodiments may be performed without locking during reads. As a result, lock contention and other performance issues caused by locking are minimized. Further, in case of a failure or crash during an update, the transaction ID is marked as cancelled and subsequent reads will result in determining that the update is invalid. Thus, the transaction is implicitly "rolled back" by virtue of its status update rather than needing to be rolled back by actively updating objects that were involved in the transaction when a failure occurs.

Figure 1:
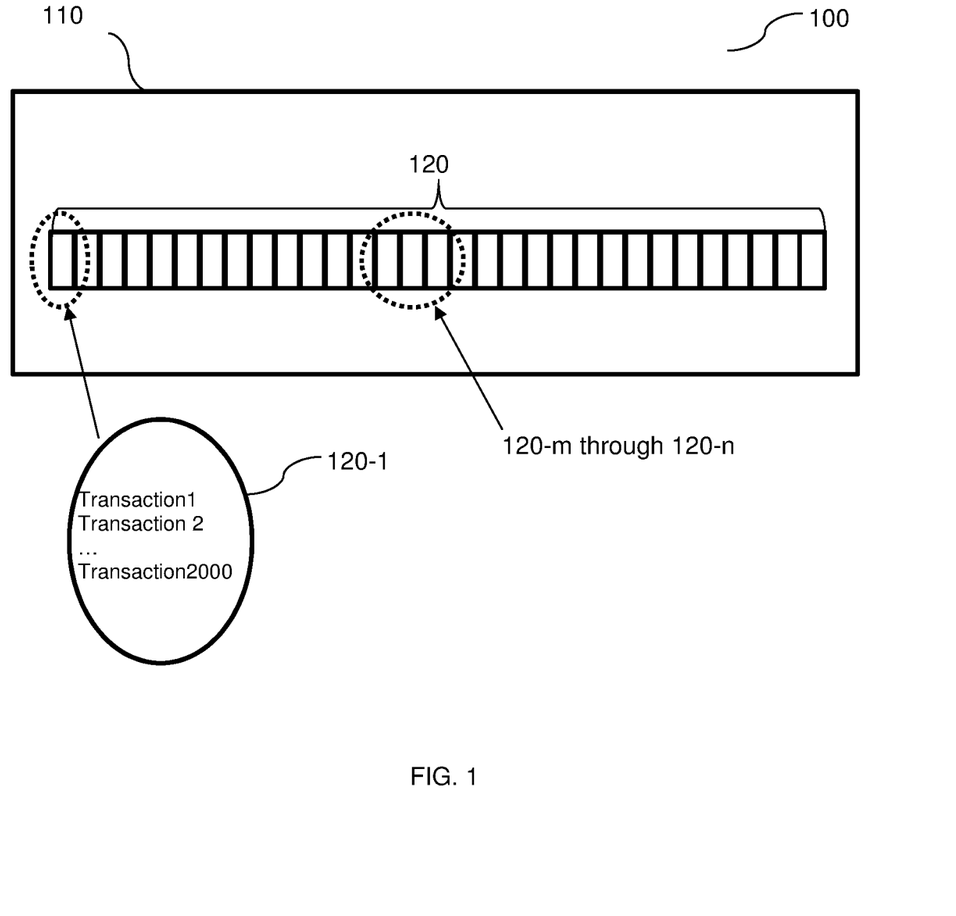
FIG. 1 is a block diagram illustrating a bitmap array in a memory according to an embodiment.

FIG. 1 shows an example block diagram 100 of a bit array 120 contained in a memory 110 according to an embodiment. The bit array 120 is divided into blocks including a block 120-1 and central blocks 120-$m$ through 120-$n$. In the example implementation shown in FIG. 1, the block 120-1 includes transactions "Transaction1" through "Transaction2000." The central blocks 120-$m$ through 120-$n$ contain transaction identifiers (not shown) indicating current states of the transactions of the other blocks of the bit array 120.

It should be noted that block 120-1 is shown as having exactly 2000 transactions merely for example purposes and without limitation on the disclosed embodiments. Different numbers of transactions may be included in each block without departing from the scope of the disclosure. Additionally, the relative positioning of the central blocks may differ.

Figure 2:
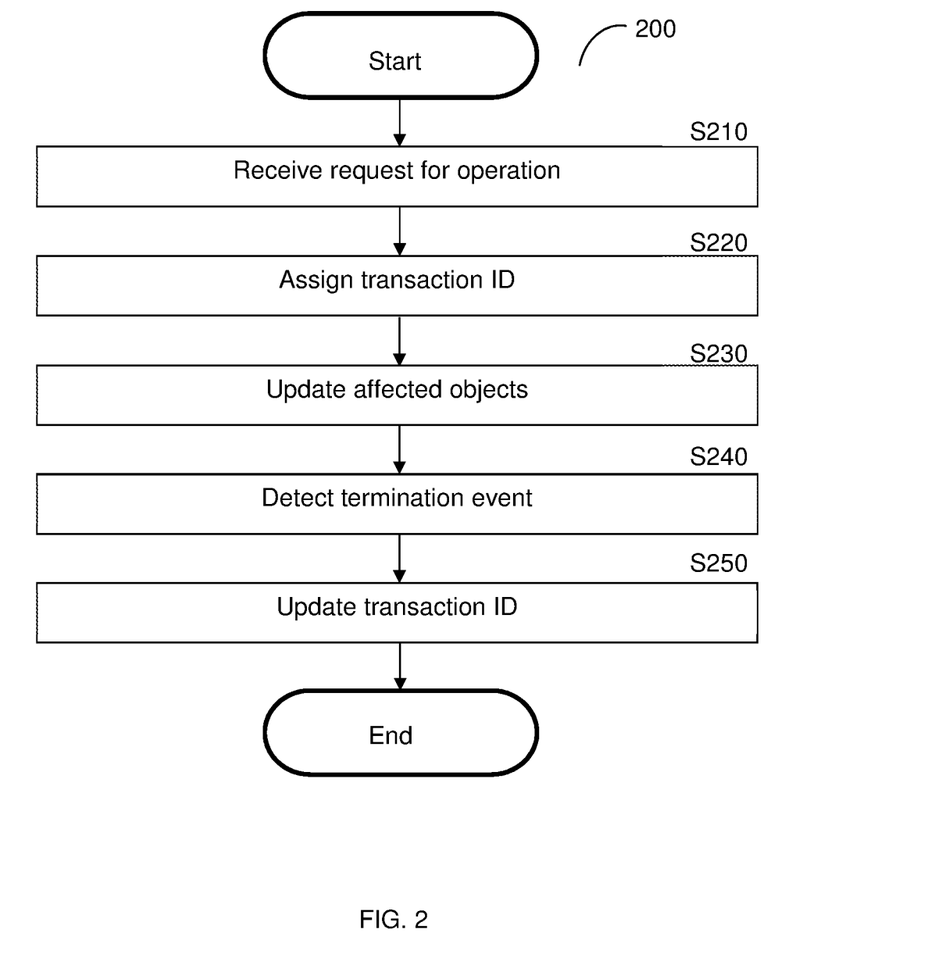
FIG. 2 is a flowchart illustrating a method for managing transactions according to an embodiment.

FIG. 2 is an example flowchart 200 illustrating a method for transaction management according to an embodiment. In an embodiment, the method is performed with respect to a system including a memory (e.g., the memory 110, FIG. 1) for storing transaction data.

At S210, a request for an operation is received. The operation is to be performed on one or more objects stored in a storage system. Specifically, the operation includes adding, removing, or moving a file and updating associated metadata accordingly. The storage system may be a distributed storage system, for example as described herein with respect to FIG. 5.

At S220, a transaction ID is assigned to a transaction including the requested operation. The transaction ID is a unique identifier assigned to the transaction and includes a state of the transaction. The initial state (i.e., the state when the transaction ID is assigned) is "in progress" such that the transaction ID initially indicates that the transaction is in progress.

At S230, any affected objects are updated to add an entry to each. The added entries include a conditional entry that is conditioned on the state of the transaction as indicated by the current transaction ID for the transaction. The conditional entries may indicate whether to add or remove specific files from the object metadata depending on the state of the transaction ID. When a reader subsequently attempts to read one of the updated objects, the result of the read is based on any conditional entries and the respective transaction states.

At S240, a termination event is detected. The termination event may include, but is not limited to, completion of the transaction, cancellation of the transaction, or failure of the application executing the transaction. The failure of the application executing the transaction may include failure of an instance of the application when the affected objects are stored in blocks marked with an instance ID of the instance as described herein above.

In an embodiment, transactions may be retried in the event of a failure. For example, an application that frees up space of deleted files in the background will always retry deletions in case of a failure. To this end, transactions may be performed in order and a counter may be incremented to indicate completion of transactions. In such an embodiment, the detected termination event for a transaction may be incrementing of the counter to a value that indicates the completion of the transaction. As a non-limiting example, if a completion event for a third transaction in an order may be incrementing of a counter to 3.

At S250, when a termination event has occurred, the transaction ID is updated accordingly. The termination event signals a change from the transaction being in progress to the transaction being terminated (e.g., completed, cancelled, or failure in an application executing the transaction). As a non-limiting example, the transaction ID may be updated to indicate a state "committed" if the detected event is a completion event, while the transaction ID may be updated to indicate a state "cancelled" if the detected event is a cancellation or failure event.

As a non-limiting example, a rename operation is to be performed to move file x from directory A to directory B. A new transaction ID "TrID" is assigned to the rename operation. TrID initially indicates a state of "in progress." When the rename operation is completed, directory A is updated to include an entry "remove file x from its metadata if TrID is completed," directory B is updated to include an entry "add file x to its metadata if TrID is completed," the parent pointer of file x is changed from a location in directory A to a location in directory B, and TrID is updated to mark its state as "committed." When a subsequent reader attempts to read the contents of directory A after TrID has been marked as "committed," the reader reads the entry "remove file x from its metadata if TrID is completed" and checks the status of TrID. Since the status of TrID is "committed," the reader returns the contents of directory A excluding file x.

Continuing the above example, if the rename operation is cancelled or the instance of the application executing the rename operation fails, TrID is updated to mark its status as "cancelled." When a subsequent reader attempts to read the contents of directory A, the reader reads the entry "remove file x from its metadata if TrID is completed." The reader then checks the state of TrID and determines that TrID's status is "cancelled." Accordingly, the reader returns the contents of directory A including file x since TrID was not completed. The failure of an instance of the application executing the operation may be determined using instance IDs. For example, blocks in directory A, including the block in which TrID is stored, can be marked with an instance ID of the application (thereby indicating that those blocks are allocated to that application instance) such that, when the application instance fails, TrID is updated to mark its status as "cancelled" due to its inclusion in a block marked with the instance ID of the failed application instance.

In case TrID has a status of "in progress" when a reader attempts to read directory A, the reader reads the entry "remove file x from its metadata if TrID is completed." The reader then checks the state of TrID and determines that TrID's status is "in progress." Accordingly, the reader returns the contents of directory A including file x since TrID was not completed.

In some cases, a reader may be required to wait. For example, when conflicting operations are requested simultaneously (i.e., a second operation is requested while a first operation is being performed), the reader may wait until one of the conflicting operations is resolved to determine how to read an object. The conflicting operations may be noted as conflicting entries in the object being read. Returning to the above example, when an operation moving file x from directory A to directory B is being performed and another operation moving file x from directory A to directory C is requested, the reader identifies the conflicting operations and waits until the operation moving file x to directory B is resolved (e.g., completed or cancelled) before determining the result to return.

It should be noted that, at any time during performance of the method of FIG. 2, a reader may attempt to read one of the affected objects that will be affected by the transaction. The results of the read depend on whether the affected objects have been updated to include conditional entries and, if a conditional entry for the transaction has been added, the state indicated by the transaction ID at the time of reading.

Figure 3:
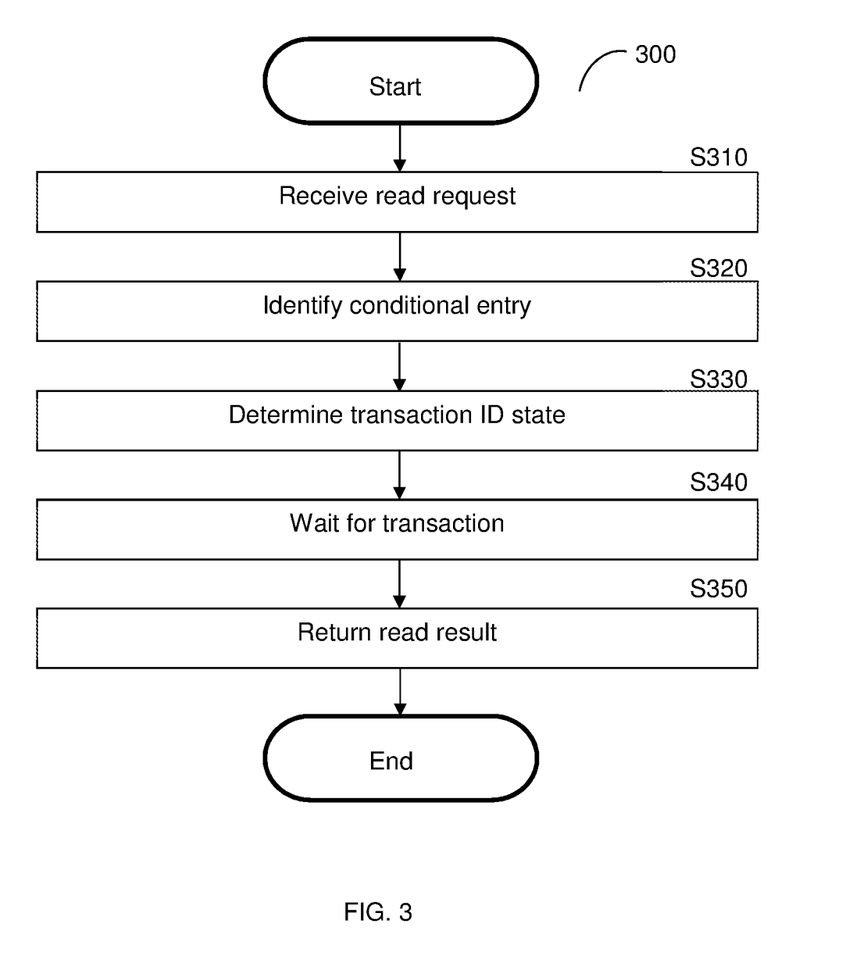
FIG. 3 is a flowchart illustrating reading an object including conditional entries.

FIG. 3 is an example flowchart illustrating a read of an object based on transaction IDs. The object may be an object modified to include one or more conditional entries as described with respect to FIG. 2.

At S310, a read request is received. The request is to return the contents of the object.

At S320, a conditional entry in the requested object is identified. The conditional entry indicates a condition with respect to a transaction ID (e.g., "if transaction ID is committed") and a modification of the object dependent on the condition (e.g., "remove file x from metadata," "add file x to metadata," etc.).

At S330, a state of the transaction ID indicated in the conditional entry is determined. The state may be determined based on an object containing the transaction ID. In an example implementation, the state may be any of committed, cancelled, and in progress.

At optional S340, when the determined state is "in progress," the reader may wait. To this end, S340 may include stalling execution and re-checking the transaction ID state until a final state (e.g., either "committed" or "cancelled") is determined. Whether the reader should wait until the transaction is completed or cancelled may depend on the operation being performed by the reader. In an example implementation, the reader waits for transactions that are depended upon by its current operation and ignores other transactions (i.e., execution continues with S350 even if the state is "in progress").

At S350, based on the determined state and the conditional entry, a read result is returned. The read result is further based on whether a state indicated by the conditional entry matches the current state of the transaction at the time of reading. The read result may include, for example, the contents of the object at the time of reading including or excluding any added or removed files, respectively.

It should be noted that FIG. 3 is discussed as including reading based on one conditional entry merely for simplicity purposes, and that multiple conditional entries may be included in an object, thereby requiring multiple checks of transaction IDs.

Figure 4:
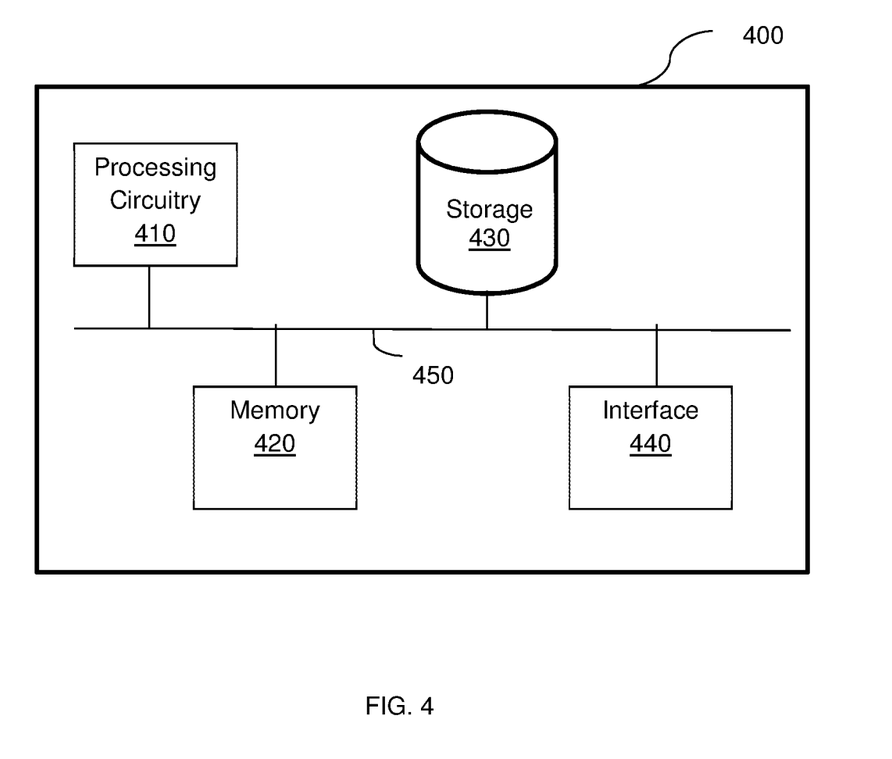
FIG. 4 is a schematic diagram of a system which may implement a transaction manager according to an embodiment.

FIG. 4 is a schematic diagram of a system 400 which is configured to implement a transaction manager (not shown) according to an embodiment. The system 400 includes a processing circuitry 410, a memory 420, a storage 430, and an interface 440. The components of the transaction manager may be connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be a volatile memory such as, but not limited to, Random Access Memory (RAM). In an embodiment, the memory 420 is configured to store software for execution by the processing circuitry 410. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein and, in particular, configure the system to provide a transaction manager that acts in accordance with one or more of the disclosed embodiments.

The storage 430 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 430 may store the instructions for transfer to and storage in the memory 420 for execution by the processing circuitry 410.

The interface 440 allows the system 400 to receive requests for operations and to access a storage storing persistent state objects. The interface 440 may be, but is not limited to, a network interface.

It should be understood that the embodiments described herein are not limited to the specific architecture illustrated in FIG. 4, and other architectures may be equally used without departing from the scope of the disclosed embodiments.

Figure 5:
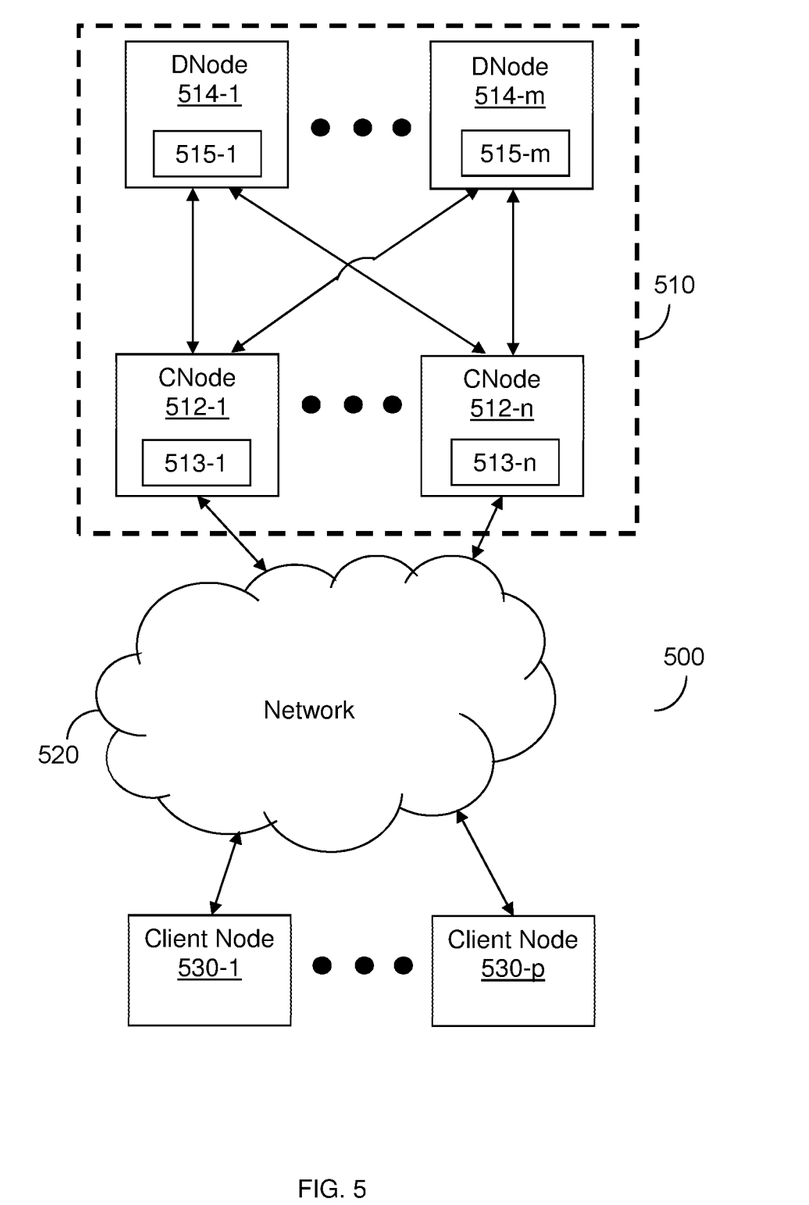
FIG. 5 is a network diagram illustrating a distributed storage system in which transaction managers may be implemented according to an embodiment.

FIG. 5 is a network diagram 500 illustrating a distributed storage system 510 in which transaction managers may be implemented according to an embodiment. The network diagram 500 includes the distributed storage system 510, a network 520, and client nodes 530-1 through 530-p (referred to as a client node 530 or as client nodes 530 for simplicity).

The distributed storage system 510 may be configured as described further in U.S. patent application Ser. No. 16/002,676, assigned to the common assignee, the contents of which are incorporated by reference. The distributed storage system 510 includes a plurality of compute nodes (CNodes) 512-1 through 512-n (hereinafter referred to individually as a CNode 512 and collectively as CNodes 512 for simplicity) and a plurality of storage nodes (DNodes) 514-1 through 514-m (hereinafter referred to individually as a DNode 514 and collectively as DNodes 514 for simplicity).

Each CNode 512 may be configured as described herein above with respect to FIG. 4 and is configured to implement a respective transaction manager 513. Each transaction manager 513 is configured to assign and update transaction IDs for transactions occurring with respect to data stored in the DNodes 514. To this end, each DNode 514 has a persistent memory portion 515. The persistent memory portions 515 store transaction IDs indicating the state of each transaction. In an example implementation, the persistent memory portion 515 may be included in XPoint storage.

The network 520 may be, but is not limited to, a wireless, cellular or wired network, a local area network (LAN), a wide area network (WAN), a metro area network (MAN), the Internet, the worldwide web (WWW), similar networks, and any combination thereof. The client node 530 may be, but is not limited to, a server, a personal computer, a laptop, a tablet computer, a smartphone, or any other device configured to store data, access data, or both.

The client node 530 is configured to send access commands to the distributed storage system 510 via the network 520. The CNodes 512 may be configured to translate access commands received from the client nodes 530 and to access the DNodes 514 based on the translated commands. As shown in FIG. 5, in an example implementation, each CNode 512 may access all of the DNodes 514. As a non-limiting example, NVM Express (NVMe) over Fabrics may be utilized to enable such access.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof.

Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A system for transaction management, comprising:
a processing circuitry; and
a memory, the memory containing instructions that, when executed by the processing circuitry, configure the system to:
assign a transaction identifier (ID) to a transaction, wherein the transaction includes at least one modification to at least one object stored in a storage system;
update a state of the transaction to indicate that the transaction is in progress;
add at least one conditional entry to each object of the at least one object that is expected to be affected by the transaction, wherein each conditional entry identifies at least one modification that is expected to be applied on the object by the transaction;
in response to a subsequent read request addressed to a certain object of the at least one object, identify that a first conditional entry exists for the certain object, wherein the first conditional entry is associated with the transaction, and determine a current state of the transaction;
respond to the subsequent read request based on the first conditional entry, and the current state of the transaction; and
update the state of the transaction when a termination event occurs.

2. The system of claim 1, wherein the responding to the subsequent read request is further based on whether the current state of the transaction indicates that the transaction cannot be completed.

3. The system of claim 1, wherein the state of the transaction is updated to at least one of: committed, and cancelled.

4. The system of claim 1, wherein the termination event is any one of:
completion, cancellation, and failure.

5. The system of claim 1, wherein the termination event is a failure of the transaction, wherein the transaction is retried when the failure occurs during the transaction.

6. The system of claim 1, wherein the state of the transaction is stored in a block, wherein the block is assigned an instance ID indicating an instance of an application to which the block is allocated, wherein the state of the transaction is changed to cancelled when the instance of the application indicated by the instance ID has failed.

7. The system of claim 1, wherein the storage system is a distributed storage system.

8. The system of claim 1, wherein the responding to the subsequent read request further comprises:
in a case where it is determined that the transaction is not completed, respond to the subsequent read request by ignoring a first modification indicated by the first conditional entry;
in a case where it is determined that the transaction is completed, respond to the subsequent read request by applying the first modification on the certain object.

9. The system of claim 1, wherein the transaction is a first transaction, wherein the responding to the subsequent read request further comprises:
identify that a second conditional entry exists for the certain object, wherein the second conditional entry is associated with a second transaction; wherein a first modification indicated by the first conditional entry conflicts with a second modification indicated by the second conditional entry; and
wait until at least one of the second transaction and the first transaction is completed.

10. A non-transitory computer readable medium having stored thereon instructions for causing a processing circuitry to execute a process, the process comprising:
assigning a transaction identifier (ID) to a transaction, wherein the transaction includes at least one modification to at least one object stored in a storage system;
updating a state of the transaction to indicate that the transaction is in progress;
adding at least one conditional entry to each object of the at least one object that is expected to be affected by the transaction, wherein each conditional entry identifies at least one modification that is expected to be applied on the object by the transaction;
in response to a subsequent read request addressed to a certain object of the at least one object, identifying that a first conditional entry exists for the certain object, wherein the first conditional entry is associated with the transaction, and determining a current state of the transaction;
responding to the subsequent read request based on the first conditional entry, and the current state of the transaction; and
updating the state of the transaction when a termination event occurs.

11. A method for transaction management, comprising:
assigning a transaction identifier (ID) to a transaction, wherein the transaction includes at least one modification to at least one object stored in a storage system;
updating a state of the transaction to indicate that the transaction is in progress;
adding at least one conditional entry to each object of the at least one object that is expected to be affected by the transaction, wherein each conditional entry identifies at least one modification that is expected to be applied on the object by the transaction;
in response to a subsequent read request addressed to a certain object of the at least one object, identifying that a first conditional entry exists for the certain object, wherein the first conditional entry is associated with the transaction, and determining a current state of the transaction;

responding to the subsequent read request based on the first conditional entry, and the current state of the transaction; and updating the state of the transaction when a termination event occurs.

12. The method of claim 11, wherein the responding to the subsequent read request is further based on whether the current state of the transaction indicates that the transaction cannot be completed.

13. The method of claim 11, wherein the state of the transaction is updated to at least one of: committed, and cancelled.

14. The method of claim 11, wherein the termination event is any one of:
completion, cancellation, and failure.

15. The method of claim 11, wherein the termination event is a failure of the transaction, wherein the transaction is retried when the failure occurs during the transaction.

16. The method of claim 11, wherein the state of the transaction is stored in a block, wherein the block is assigned an instance ID indicating an instance of an application to which the block is allocated, wherein the state of the transaction ID is changed to cancelled when the instance of the application indicated by the instance ID has failed.

17. The method of claim 11, wherein the storage system is a distributed storage system.

18. The method of claim 11, wherein the responding to the subsequent read request further comprises:
in a case where it is determined that the transaction is not completed, respond to the read request by ignoring a first modification indicated by the first conditional entry;
in a case where it is determined that the transaction is completed, respond to the read request by applying the first modification on the certain object.

19. The system of claim 11, wherein the transaction is a first transaction, wherein the responding to the subsequent read request further comprises:
identifying that a second conditional entry exists for the certain object, wherein the second conditional entry is associated with a second transaction; wherein a first modification indicated by the first conditional entry conflicts with a second modification indicated by the second conditional entry; and
waiting until at least one of the second transaction and the first transaction is completed.

* * * * *